(12) United States Patent
Shin et al.

(10) Patent No.: US 11,865,573 B2
(45) Date of Patent: Jan. 9, 2024

(54) SLURRY FOR ELECTROSTATIC SPRAY DEPOSITION AND METHOD FOR FORMING COATING FILM USING SAME

(71) Applicant: Industry-University Cooperation Foundation Hanyang University, Seoul (KR)

(72) Inventors: Dong Wook Shin, Seongnam-si (KR); Se Wook Lee, Guri-si (KR); Sang Ho Park, Yangju-si (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 387 days.

(21) Appl. No.: 16/648,985

(22) PCT Filed: Sep. 28, 2018

(86) PCT No.: PCT/KR2018/011491
§ 371 (c)(1),
(2) Date: Mar. 19, 2020

(87) PCT Pub. No.: WO2019/066525
PCT Pub. Date: Apr. 4, 2019

(65) Prior Publication Data
US 2020/0282422 A1    Sep. 10, 2020

(30) Foreign Application Priority Data
Sep. 29, 2017 (KR) .................. 10-2017-0127221

(51) Int. Cl.
*B05D 1/04*    (2006.01)
*C09D 7/65*    (2018.01)
(Continued)

(52) U.S. Cl.
CPC .................. *B05D 1/04* (2013.01); *B05B 1/06* (2013.01); *B05B 5/0255* (2013.01); *B05D 7/24* (2013.01);
(Continued)

(58) Field of Classification Search
CPC ........ B05D 1/04; B05D 7/24; B05D 2201/02; B05D 2401/10; C09D 7/65; C09D 7/67; C09D 5/448; B05B 1/06; B05B 5/0255
See application file for complete search history.

(56) References Cited

U.S. PATENT DOCUMENTS 7,951,428 B2 *   5/2011   Hoerr ..................... C25D 5/003
                                                        427/479
8,083,983 B2    12/2011   Rabolt et al.

FOREIGN PATENT DOCUMENTS

JP       2013-231098 A    11/2013
JP        6120284 B2       4/2017
(Continued)

OTHER PUBLICATIONS

Hidenobu Shimizu et al., "Preparation and Characterization of Water Self-dispersible Poly(3-hexylthiophene) Particles", Polymer Journal, 2008, pp. 33-36, vol. 40, No. 1.
(Continued)

*Primary Examiner* — Robert S Walters, Jr.
(74) *Attorney, Agent, or Firm* — Sughrue Mion, PLLC

(57) ABSTRACT

A slurry for electrostatic spray deposition and method for forming a coating film using the same are provided. The slurry comprises a solvent, a first polymer dissolved in the solvent, and polymer particles containing a second polymer and dispersed in the solvent.

5 Claims, 5 Drawing Sheets

(51) Int. Cl.
    *C09D 7/40*         (2018.01)
    *B05B 1/06*         (2006.01)
    *B05B 5/025*       (2006.01)
    *B05D 7/24*         (2006.01)
    *C09D 5/44*         (2006.01)

(52) U.S. Cl.
    CPC ............... *C09D 5/448* (2013.01); *C09D 7/65* (2018.01); *C09D 7/67* (2018.01); *B05D 2201/02* (2013.01); *B05D 2401/10* (2013.01)

(56) References Cited

FOREIGN PATENT DOCUMENTS

| | | |
|---|---|---|
| KR | 1020050035743 A | 4/2005 |
| KR | 10-2008-0083637 A | 9/2008 |
| KR | 10-2012-0054513 A | 5/2012 |
| KR | 1020150101289 A | 9/2015 |
| KR | 10-2015-0137901 A | 12/2015 |
| KR | 10-2016-0147604 A | 12/2016 |
| TW | 200823252 A | 6/2008 |

OTHER PUBLICATIONS

International Search Report of PCT/KR2018/011491 dated Jan. 11, 2019 [PCT/ISA/210].

\* cited by examiner

SLURRY FOR ELECTROSTATIC SPRAY DEPOSITION AND METHOD FOR FORMING COATING FILM USING SAME

CROSS REFERENCE TO RELATED APPLICATIONS

This application is a National Stage of International Application No. PCT/KR2018/011491, filed Sep. 28, 2018, claiming priority to Korean Patent Application No. 10-2017-0127221, filed Sep. 29, 2017.

TECHNICAL FIELD

The present invention relates to a slurry and a method for forming a coating film using the same, and more particularly, to a slurry for electrostatic spray deposition and a method for forming a coating film using the same.

BACKGROUND ART

Electrostatic spray deposition is a technique of forming a coating film, in which a high voltage is applied to a fluid injected at a constant flow rate to form microdroplets, and the microdroplets are deposited on a base material to form the coating film.

Depending on the voltage applied, the spraying proceeds in several spraying modes, among which the cone-jet mode capable of spraying liquid in droplets having a small particle diameter is the most widely used spraying mode. Due to the stable droplet generation characteristics of the cone-jet mode, electrospray deposition is widely used in the field of particle production, coating, and patterning.

However, most of the electrospray deposition method is a method of spraying a solution made using a raw material, the spray method using such a solution is difficult to maintain the excellent properties of the raw material, and it is difficult to control the microstructure in the deposited film.
(Patent Document) KR 2010-0042345

DISCLOSURE

Technical Problem

Accordingly, an object of the present invention is to provide a slurry for electrostatic spray deposition capable of controlling the microstructure in a film to be formed and a method of forming a coating film using the same.

The objects of the present invention are not limited to the above-mentioned objects, and other objects not mentioned will be clearly understood by those skilled in the art from the following description.

Technical Solution

One aspect of the present invention provides a slurry for electrostatic spray. The slurry for electrostatic spray comprises a solvent, a first polymer dissolved in the solvent, and polymer particles containing a second polymer and dispersed in the solvent.

The solvent may be a mixed solvent of a first solvent that is a good solvent for the first polymer and a second solvent that is a bad solvent for the second polymer. The second solvent may be contained in an amount of 10 to 1000 parts by weight based on 100 parts by weight of the first solvent. The first solvent may be a solvent having a Hansen Relative Energy Difference (RED) of less than 1 for the first polymer, and the second solvent may be a solvent having a RED of greater than 1 for the second polymer. The RED is represented by the following equation.

$$RED = R_a/R_0 \quad \text{[Equation]}$$

In the above equation, $$R_a = \sqrt{(2\delta_{h2} - 2\delta_{h1})^2 + (\delta_{p2} - \delta_{p1})^2 + (\delta_{d2} - \delta_{d1})^2},$$

$R_0$ is the polymer's interaction radius, $\delta_{h1}$ is the polymer's hydrogen bond interaction, $\delta_{p1}$ is the polymer's polar interaction, $\delta_{d1}$ is the polymer's dispersion force, $\delta_{h2}$ is the solvent's hydrogen bond interaction, $\delta_{p2}$ is the solvent's polarity interaction, and $\delta_{d2}$ is the solvent's dispersion force.

The first polymer may be in a saturated state in the solvent. The slurry may further comprise the second polymer dissolved in the solvent. The first polymer and the second polymer may be the same polymer.

The polymer particles may have an average diameter of several to several tens of nm.

The slurry may further comprise a solvent having a dielectric constant c in the range of 4 to 40.

Another aspect of the present invention provides an electrostatic spray deposition method. The method comprises injecting the slurry into a syringe of an electrospray apparatus including the syringe connected to a nozzle and a stage positioned below the nozzle. A predetermined electric field is applied between the nozzle and the stage to spray droplets in cone-jet mode from the nozzle, and the droplets are deposited on the substrate.

Another aspect of the present invention provides a coating film. The coating film comprises a plurality of polymer particles disposed on a substrate, and a connection part connecting the polymer particles.

Advantageous Effects

According to the present invention as described above, a film deposited on a substrate using an electrostatic spray method can have a microstructure having particles and pores. In addition, the size of the particles and the degree of pore formation can be controlled.

However, the effects of the present invention are not limited to the above-mentioned effects, and other effects not mentioned will be clearly understood by those skilled in the art from the following description.

MODES OF THE INVENTION

Figure 1:
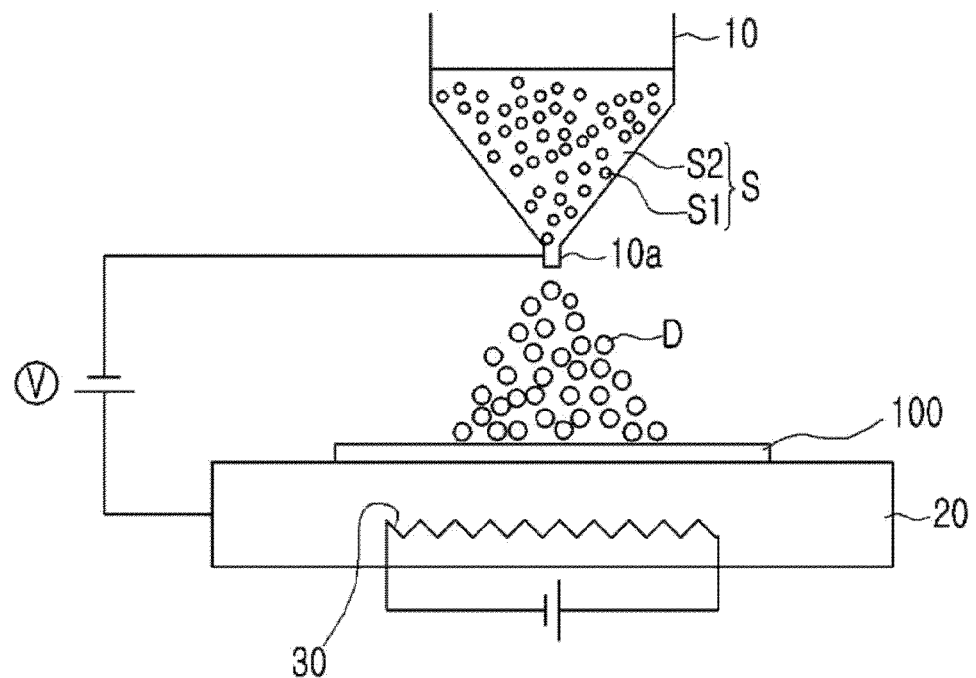
FIG. 1 is a schematic diagram showing an electrostatic spray method using a slurry according to an embodiment of the present invention.

While the present invention is susceptible to various modifications and alternative forms, specific embodiments thereof are shown by way of example in the drawings and will herein be described in detail. However, the description is not intended to limit the present disclosure to the specific exemplary embodiments, and it is to be understood that all the changes, equivalents, and substitutions belonging to the spirit and technical scope of the present disclosure are included in the present disclosure. In the drawings, where a layer is said to be "on" another layer or substrate, it may be formed directly on the other layer or substrate, or a third layer may be interposed therebetween.

Embodiment 1: Slurry for Electrostatic Spraying

A slurry according to an embodiment of the present invention has a solvent, a first polymer dissolved in the solvent, and polymer particles having a second polymer and dispersed in the solvent. In other words, the slurry may have a form in which the polymer particles are dispersed in a solution of the first polymer. The first polymer may be in a saturated state in the solvent. The slurry may further include a second polymer dissolved in the solvent.

The polymer particles may have an average diameter of several to several tens nm, for example, 1 to 90 nm and specifically 5 to 20 nm.

The polymers are, irrespective of each other, vinyl polymers such polyalkenes (e.g., polyethylene (PE), polypropylene (PP), poly(isobutylene)), polyvinyl alcohol (PVA), polyvinyl acetate (PVAc), Polyvinyl pyrrolidone, polystyrene (PS), polyvinyl cycloalkane (e.g., polyvinyl cyclohexane), polyacrylic acid, polyacrylate, polymethacrylate (PMA), polymethylmethacrylate (PMMA), polyacrylonitrile (PAN), acrylonitrile butadiene styrene (ABS), polyvinylidene fluoride (PVDF), and polytetrafluoroethylene; polyimides; polyamides; polyethers (e.g., polyethylene oxide (PEO), polypropylene oxide (PPO)); polyamines; polycarbonates (PC); polyesters such as polyalkylene terephthalates (e.g., polyethylene terephthalates), polyisocyanates, polyvinyl butyral, polysaccharides such as hydroxyethylcellulose (HEC), ethylcellulose, cellulose ethers, or the copolymer of any one of them, but various polymers may be selected according to the use of a coating film without being limited thereto.

The solvent may be a mixed solvent of a first solvent and a second solvent, wherein the first solvent may have a good affinity with the first polymer, that is, a good solvent for the first polymer, and the second solvent may have a poor affinity with the second polymer, that is, a bad solvent for the second polymer. The first solvent and the second solvent may be solvents compatible or miscible with each other. As an example, the second solvent may be contained in an amount of 10 to 1000 parts by weight, specifically 30 to 200 parts by weight, more specifically 40 to 150 parts by weight, based on 100 parts by weight of the first solvent.

The good solvent may be a solvent having a Hansen Relative Energy Difference (RED) of less than 1 for the first polymer, and the poor solvent may be a solvent having a RED greater than 1 for the second polymer. The RED is represented by the following equation.

$$RED = R_a/R_0$$

$$R_a = \sqrt{(2\delta_{h2} - 2\delta_{h1})^2 + (\delta_{p2} - \delta_{p1})^2 + (\delta_{d2} - \delta_{d1})^2}$$

In the above equation, $R_0$ is the polymer's interaction radius, $\delta_{h1}$ is the polymer's hydrogen bond interaction, $\delta_{p1}$ is the polymer's polar interaction, $\delta_{d1}$ is the polymer's dispersion force, $\delta_{h2}$ is the solvent's hydrogen bond interaction, $\delta_{p2}$ is the solvent's polar interaction, and $\delta_{d2}$ is the solvent's dispersion force.

Each of the first solvent and the second solvent that satisfies these conditions may be a nonpolar solvent such as an alkane solvent (e.g., pentane, hexane, heptane, dodecane), a cycloalkane solvent (e.g., cyclopentane, cyclohexane), benzene, toluene, 1,4-dioxane, chloroform, diethyl ether and dichloromethane (DCM); a polar aprotic solvent such as tetrahydrofuran (THF), ethyl acetate, acetone, dimethylformamide (DMF), acetonitrile (MeCN), dimethyl sulfoxide (DMSO), nitromethane and propylene carbonate; or a polar protic solvent such as formic acid, alcohol (e.g., methanol, ethanol, n-propanol, isopropanol, butanol), acetic acid, or water, but is not limited thereto.

In one example, the first polymer and the second polymer may be the same polymer. In this case, the polymer particles may be formed by being precipitated from the polymer dissolved in the solvent. In addition, the first solvent and the second solvent may be a good solvent and a poor solvent for the same polymer.

The slurry can be obtained by the following method. In one example, in a polymer solution in which a first polymer is dissolved in a solvent, polymer particles containing a second polymer may be mixed. In this case, the first polymer and the second polymer may be different polymers. The solvent may be a good solvent for the first polymer and a poor solvent for the second polymer. The solvent may be a single solvent rather than a mixed solvent.

In another example, a polymer solution having a first polymer and a second polymer dissolved in a first solvent may be prepared, and a second solvent may be added to the polymer solution to selectively precipitate the second polymer to form polymer particles having the second polymer. In this case, the first polymer and the second polymer may be different polymers. In addition, the first solvent may have a good affinity with the first polymer and the second polymer, that is, may be a good solvent for the first polymer and the second polymer. The second solvent may be compatible or miscible with the first solvent, and may be a poor solvent selectively for the second polymer. In addition, the second solvent may be added in an amount such that the second polymer may be precipitated into polymer particles.

In still another example, a polymer solution in which a polymer is dissolved in a first solvent may be prepared, and a second solvent may be added to the polymer solution to precipitate the polymer, thereby producing polymer particles in the polymer solution. In this case, the first solvent may have a good affinity with the polymer, that is, may be a good solvent for the polymer, and the second solvent may be a poor solvent with respect to the polymer while being compatible or miscible with the first solvent. In addition, the second solvent may be added in an amount such that the polymer can be precipitated into polymer particles.

Meanwhile, the slurry may additionally contain a third solvent having a dielectric constant c in the range of 4 to 40. In this case, the slurry may form a cone-jet mode in the electrostatic spraying process described below. However, adding the third solvent may be omitted if the first solvent and the second solvent are solvents having a dielectric constant within the range of 4 to 40. The third solvent may be diethyl ether (ε=4.3), chloroform (ε=4.81), anisole (ε=5), ethyl acetate (ε=6.02), acetic acid (ε=6.2), tetrahydrofuran (THF) (ε=7.5), dichloromethane (DCM) (ε=9.1), 1,2-dichloroethane (ε=10.36), isopropyl alcohol (IPA) (ε=18), n-butanol (ε=18), n-propanol (ε=20), acetone (ε=21), tri-ethylene glycol (ε=23.69), ethanol (ε=24.55), methanol (ε=33), N-methyl-2-pyrrolidone (ε=33), acetonitrile (MeCN) (ε=37.5), or dimethylformamide (DMF) (ε=37).

Embodiment 2: Manufacturing Method of Coating Film Using Slurry for Electrostatic Spraying FIG. 1 is a schematic diagram showing an electrostatic spray method using a slurry according to an embodiment of the present invention.

Referring to FIG. 1, an electrostatic spraying device may include a syringe including a slurry S, a nozzle 10a connected to the syringe and spraying the slurry, and a stage 20 disposed below the nozzle and supporting a substrate 100. The slurry (S), as described in the first embodiment, may include a polymer solution (S2) having a solvent and a first polymer dissolved in the solvent, and polymer particles (S1) dispersed in the solvent or the polymer solution, wherein the polymer particles (S1) have a second polymer. Detailed description of the slurry (S) will be referred to the first embodiment.

When a predetermined electric field is applied between the nozzle 10a and the stage 20, a Taylor cone may be formed at the nozzle 10a, which causes a jet or droplets to eject, the jet may be broken into small and highly charged droplets, and these droplets may be deposited on the substrate 100 while being dispersed due to the coulomb repulsive force. This spray mode may be referred to as a cone-jet mode. Polymeric particles S1 may be contained in the droplets.

Specifically, while the droplet is flying from the nozzle 10a onto the substrate 100, the first polymer may be deposited on the surface of the polymer particles S1 by heterogeneous nucleation through evaporation of the solvent from the droplet and precipitation of the first polymer dissolved in the solvent, thereby increasing the size of the polymer particles in the droplet. Accordingly, the polymer particles may have a core including the second polymer and a shell including the first polymer. The polymer particles and the residual solvent may be deposited together on the substrate 100, and further precipitation of the first polymer from the residual solvent may occur to create a connecting part (neck) including the first polymer and connecting the polymer particles to each other.

Depending on the distance between the nozzle 10a and the substrate 100, the magnitude of the electric field applied between the nozzle 10a and the stage 20, the flow rate of the slurry ejected from the nozzle 10a, or the size of the polymer particle S1 in the slurry S, the thickness, uniformity, surface properties, etc. of the thick film deposited on the substrate 100 may vary. As an example, the electrostatic spraying may be performed under a condition of 1 to 20 cm of the distance between the nozzle 10a and the substrate 100, 1 to 10 ml/h of the slurry flow rate, DC voltage 1 to 20 kV of the electric field applied between the nozzle 10a and the stage 20, and 10 seconds to 90 minutes of a spray time.

The substrate 100 may be heated by a predetermined heat source while the slurry is electrostatic sprayed. The heat source may include a hot wire 30 or a light source (halogen lamp, UV lamp, etc.). As the film deposited on the substrate 100 is dried by the heat source while the slurry is electrostatic sprayed, the mechanical strength of the film and the bonding force with the substrate 100 may be increased, and the contactability may be improved. In addition, the subsequent drying step may be unnecessary, so that the process time required for film formation can be shortened.

Figure 2:
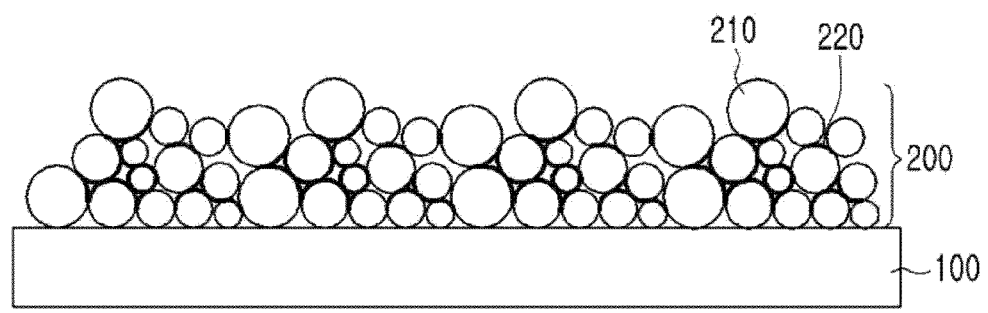
FIG. 2 is a cross-sectional view schematically showing a coating film using a electrostatic spray method using a slurry according to an embodiment of the present invention.

FIG. 2 is a cross-sectional view schematically showing a coating film using a electrostatic spray method using a slurry according to an embodiment of the present invention.

Referring to FIG. 2, the film 200 deposited on a substrate 100 may have polymer particles 210 having a diameter of several tens of nanometers to several tens of micrometers, specifically, 100 nm to 10 μm, more specifically 1 to 5 μm. Pores may exist between the particles 210, and the particles 210 may be connected to each other through a connection part i.e., a neck 220. The deposited film 200 may have a thickness of about 0.1 to 200 μm.

The polymer particle 210 may have the form of a core/shell, the shell may contain a first polymer, and the core may contain a second polymer. The polymer particles 210 having the core/shell shape may be formed by precipitation of the first polymer dissolved in a solvent in the slurry on the polymer particles (S1 in FIG. 1) as described with reference to FIG. 1. Meanwhile, the connection portion 220 may contain the first polymer. As described with reference to FIG. 1, it may be formed by further precipitation of the first polymer, which was present in the slurry in the solvent, in the electrostatic spraying process, in particular on the substrate.

The coating film can be used as an adsorbent or a filter. In this case, the coating film and the lower substrate may be used together, wherein the substrate may be a porous substrate. Meanwhile, when the coating film is used as an adsorbent or a filter, a portion of the fluid permeated through the pores may be selectively adsorbed or the flow rate of the portion of the fluid may be slowed down due to the interaction with the surface of the polymer particles.

Hereinafter, preferred examples are provided to aid the understanding of the present invention. However, the following experimental example is only for helping understanding of the present invention, and the present invention is not limited by the following experimental example.

SLURRY PREPARATION EXAMPLES

As shown in Table 1, after the polymer was completely dissolved in the first solvent at room temperature to obtain a solution, the second solvent was added in small portions to the solution until the particles precipitated in the solution.

Table 1 below describes, in each case, the type and amount of the polymer, the type and amount of the first solvent, the type of the second solvent, and the minimum amount of the second solvent that can precipitate the particles in the solution.

TABLE 1

| Slurry Preparation Example No. | polymer kind | amount | first solvent kind | amount | second solvent kind | minimum amount for particle formation |
|---|---|---|---|---|---|---|
| 1 | PVA | 0.2 g | EtOH | 5 ml | distilled water | 2.5 ml |
| 2 | PVB-co-vinyl alcohol-co-vinyl acetate | | | | | 3 ml |
| 3 | PVP | | | | | 3 ml |
| 4 | P4VP | | | | | 2.5 ml |
| 5 | PVA | | | | DMC | 2 ml |
| 6 | PVB-co-vinyl alcohol-co-vinyl acetate | | | | | 3 ml |
| 7 | PVP | | | | | 3 ml |
| 8 | P4VP | | | | | 2 ml |

Figure 3:
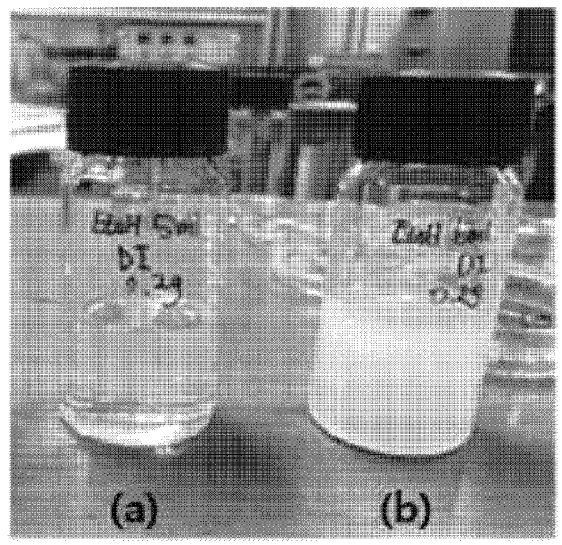
FIG. 3 is a photograph showing a slurry preparation process according to Slurry Preparation Example 2.

FIG. 3 is a photograph showing a slurry preparation process according to Slurry Preparation Example 2.

Referring to FIG. 3, when 2.5 ml of distilled water is added, the mixed solution remains colorless (a), but after 3 ml of distilled water is added, white particles are generated in the mixed solution, and the mixture is changed into a dispersion (b).

Figure 4:
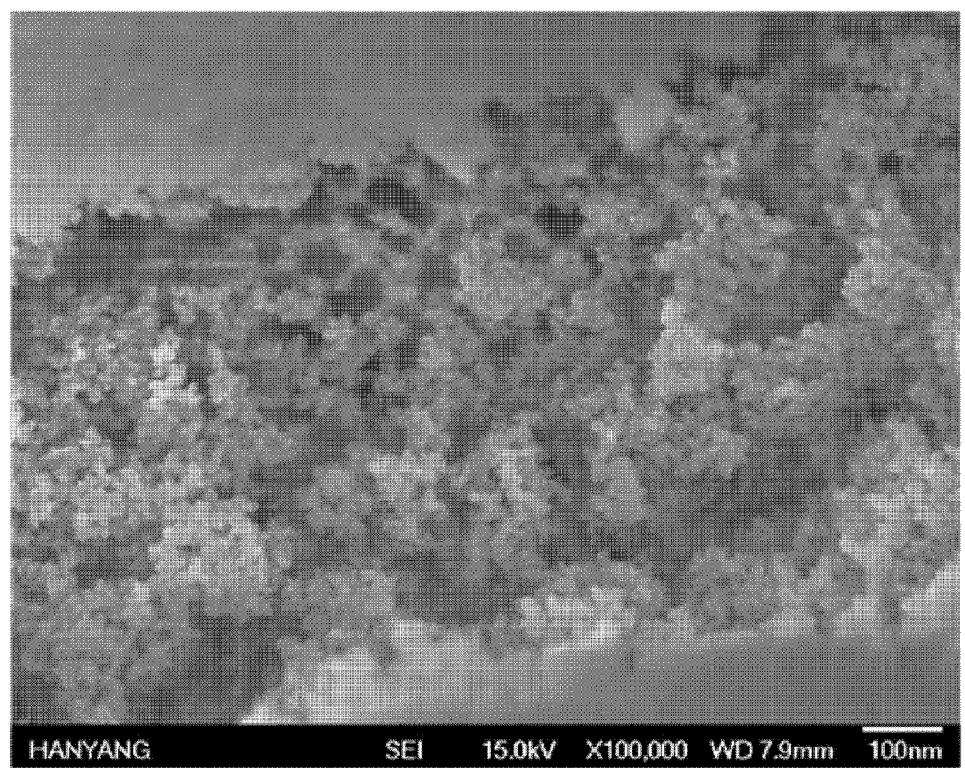
FIG. 4 is a field emission-scanning electron microscope (FE-SEM) image taken after filtering polymer particles present in the slurry according to Slurry Preparation Example 4.

FIG. 4 is a field emission-scanning electron microscope (FE-SEM) image taken after filtering polymer particles present in the slurry according to Slurry Preparation Example 4. Specifically, the slurry according to Slurry Preparation Example 4 was filtered using a vacuum filter provided with a polymer membrane filter (pore size: 30 nm), and the polymer particles obtained on the filter were observed using FE-SEM.

Referring to FIG. 4, it can be seen that the nanoparticles of 10 to 20 nm size are stacked on the filter.

Slurry Preparation Examples 9-14

As shown in Table 2, after the polymer was completely dissolved in the first solvent at room temperature to obtain a solution, the second solvent was added to the solution to obtain a dispersion in which particles precipitated in the solution.

FIGS. 5A, 5B, 5C, and 5D are graphs showing the results of analyzing the dispersions according to Preparation Examples 11 to 14 using a dynamic light scattering (DLS) particle size analyzer.

Figure 5A:
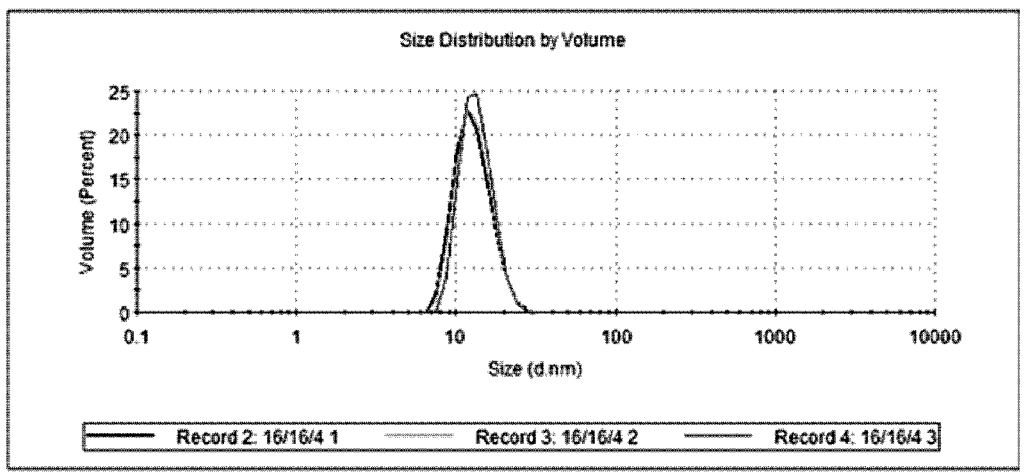
FIGS. 5A, 5B, 5C, and 5D are graphs showing the results of analyzing the dispersions according to Preparation Examples 11 to 14 using a dynamic light scattering (DLS) particle size analyzer.

Referring to FIG. 5A, the dispersion according to Preparation Example 11 was found to contain polymer particles having an average particle size of 13.05 nm.

Figure 5B:
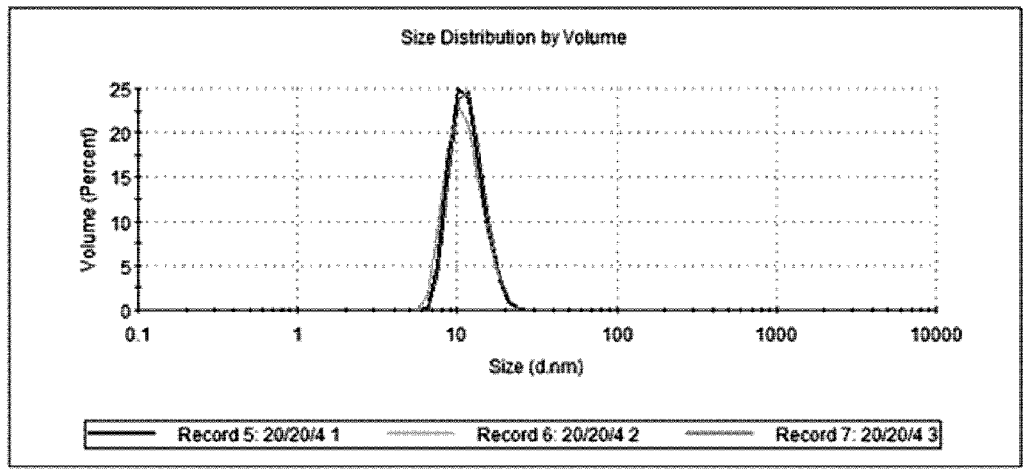

Referring to FIG. 5B, the dispersion according to Preparation Example 12 was found to contain polymer particles having an average particle size of 11.57 nm.

Figure 5C:
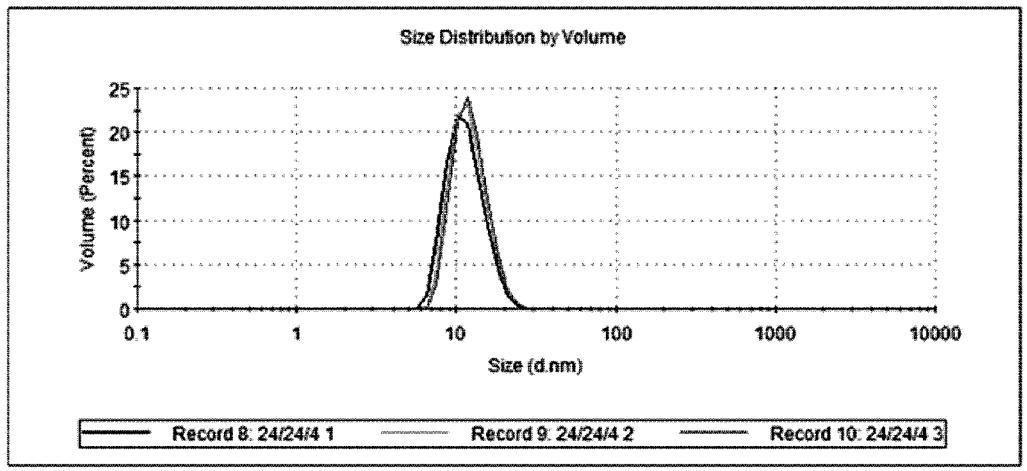

Referring to FIG. 5C, the dispersion according to Preparation Example 13 was found to contain polymer particles having an average particle size of 11.61 nm.

Figure 5D:
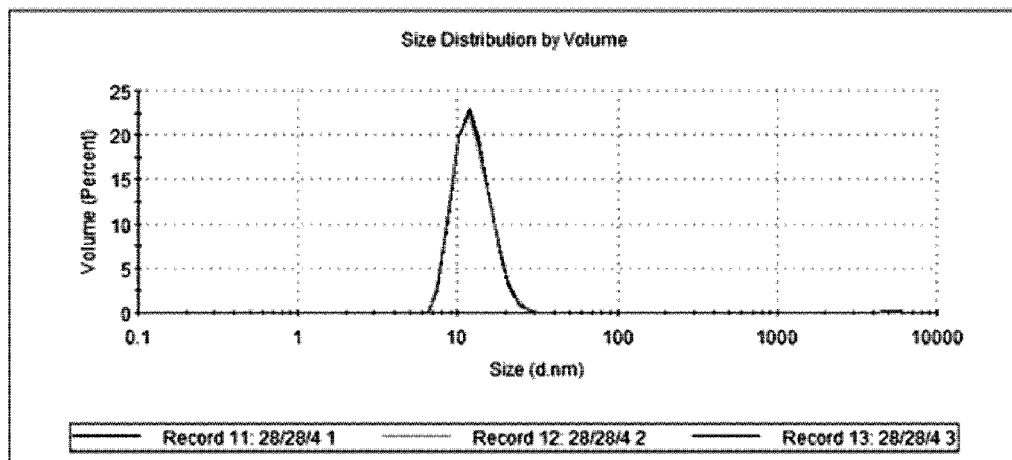

Referring to FIG. 5D, the dispersion according to Preparation Example 14 was found to contain polymer particles having an average particle size of 12.72 nm.

Coating Layer Preparation Example 1

Each of the prepared slurries was electrostatic sprayed to deposit a polymer coating layer on a silicon substrate. At this time, spraying in the cone-jet mode was carried out for 30 minutes in nitrogen atmosphere while the flow rate of the slurry was 3 mL/hr, the distance between the nozzle and the

TABLE 2

| | polymer kind | amount | first solvent kind | amount | second solvent kind | amount |
|---|---|---|---|---|---|---|
| Preparation Example 9 | PVB-co-vinyl alcohol-co-vinyl acetate | 1 g | EtOH | 10 ml | distilled water | 10 ml |
| Preparation Example 10 | PVP | 1 g | IPA | 10 ml | DMC | 10 ml |
| Preparation Example 11 | PVB-co-vinyl alcohol-co-vinyl acetate | 4 g | EtOH | 16 ml | distilled water | 16 ml |
| Preparation Example 12 | PVB-co-vinyl alcohol-co-vinyl acetate | 4 g | EtOH | 20 ml | distilled water | 20 ml |
| Preparation Example 13 | PVP | 4 g | EtOH | 24 ml | distilled water | 24 ml |
| Preparation Example 14 | PVP | 4 g | EtOH | 28 ml | distilled water | 28 ml |
| Comparative Example 1 | PVB-co-vinyl alcohol-co-vinyl acetate | 1 g | EtOH | 10 ml | — | |
| Comparative Example 2 | PVP | 1 g | IPA | 10 ml | — | | substrate was 12 cm, and the applied voltage (DC) was maintained in the range of 13 kV to 14 kV.

Figure 6:
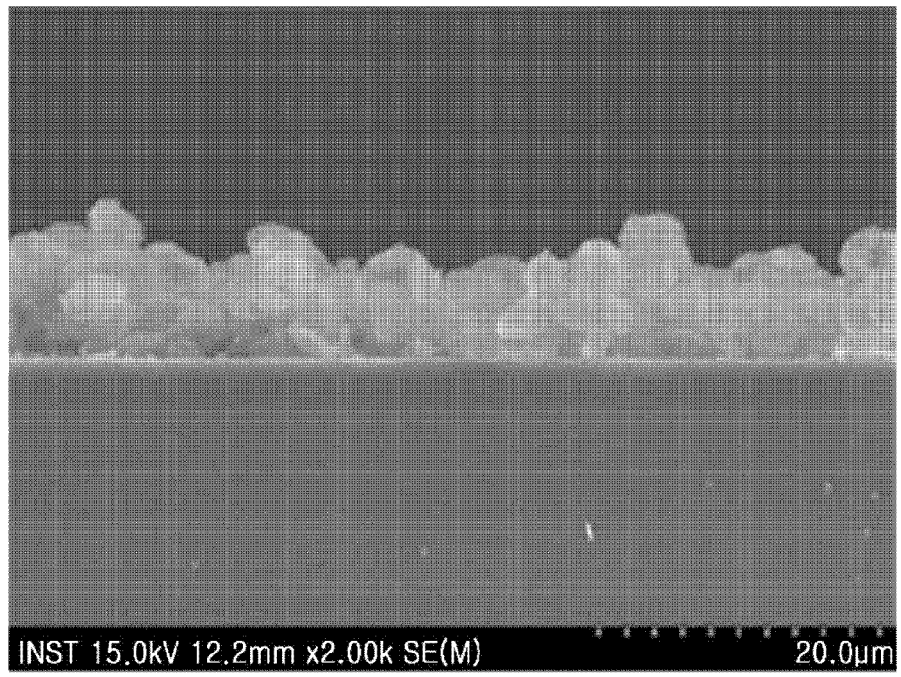
FIG. 6 is a vertical SEM image of the result of Coating Layer Preparation Example 1 using the slurry obtained according to Slurry Preparation Example 9.
Figure 7:
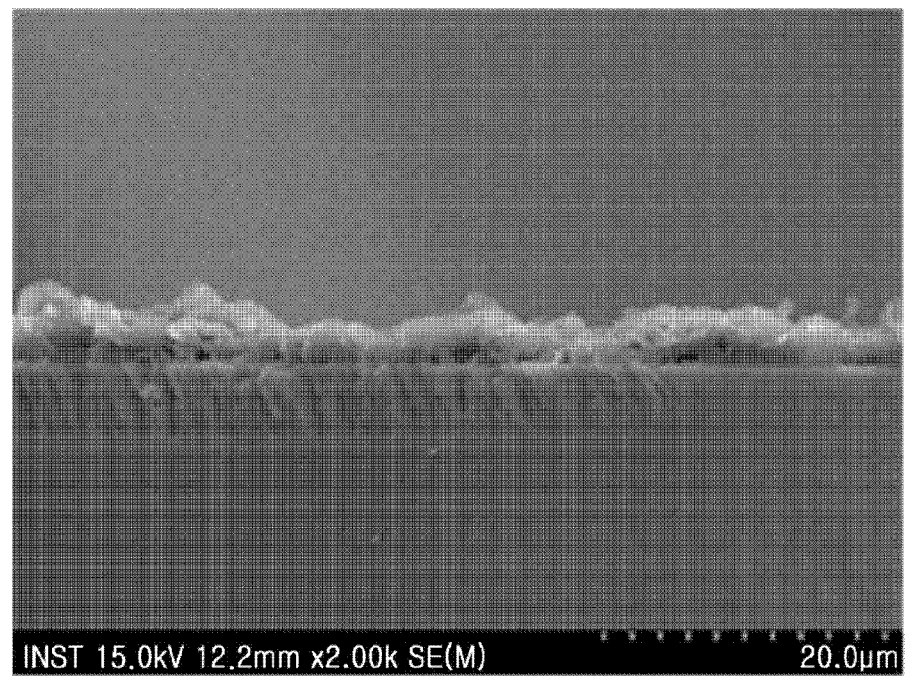
FIG. 7 is a vertical SEM image of the result of Coating Layer Preparation Example 1 using the slurry obtained according to Slurry Comparative Example 1.

FIG. 6 is a vertical SEM image of the result of Coating Layer Preparation Example 1 using the slurry obtained according to Slurry Preparation Example 9, and FIG. 7 is a vertical SEM image of the result of Coating Layer Preparation Example 1 using the slurry obtained according to Slurry Comparative Example 1.

Referring to FIG. 6, it can be seen that particles having a diameter of 100 nm to 5 μm are stacked on the substrate to a thickness of about 10 μm, and the particles are connected to each other and at the same time, pores exist between the particles. The particles stacked on the substrate appear to have increased size more than about 10 times compared to the particle size of the polymer particles precipitated in the dispersion, which is presumed to be due to further precipitation of the polymer dissolved in the dispersion through solvent evaporation during the spraying process. In addition, the connections formed between the particles are also presumed to be due to further precipitation of the polymer dissolved in the dispersion through solvent evaporation during the spraying process or after the polymer particle being stacked on the substrate.

Referring to FIG. 7, a rather dense film, not having particles, was laminated to a thickness of about 4 μm. This was presumably because the polymer was laminated on the substrate in a state where the polymer was completely dissolved in the solution, that is, in the liquid state, or was laminated on the substrate in a state in which the polymer was minimally precipitated in the spraying process to have very small particles.

On the other hand, in the case of using the composite solvent as shown in FIG. 6, the nanoparticles are already generated in the slurry (FIGS. 3, 4A-4D), and the polymer precipitates due to heterogeneous nucleation on the surface of the nanoparticles. Because of this, it is easy to form polymer particles, thereby forming a porous polymer membrane. Furthermore, by adjusting the polymer concentration in the slurry or by adjusting the mixing ratio of the first solvent and the second solvent, it is possible to adjust the concentration of the nanoparticles precipitated in the slurry and to control the size of the particles stacked on the substrate, in addition, to control the porosity of the membrane.

In the above, the present invention has been described in detail with reference to preferred embodiments, but the present invention is not limited to the above embodiments, and various modifications and changes by those skilled in the art is possible within the spirit and scope of the present invention.

The invention claimed is:

1. An electrostatic spray deposition method comprising:
   injecting a slurry into a syringe of an electrospray apparatus including the syringe connected to a nozzle and a stage positioned below the nozzle and supporting a substrate, wherein the slurry comprises a mixed solvent including a first solvent and a second solvent, a first polymer dissolved in the mixed solvent, and first polymer particles containing a second polymer and dispersed in the mixed solvent;
   applying a predetermined electric field between the nozzle and the stage to spray droplets in cone-jet mode from the nozzle; and
   depositing the droplets on the substrate to form a coating film,
   wherein the slurry is obtained by completely dissolving the first polymer and the second polymer in the first solvent and then adding the second solvent to selectively precipitate the second polymer to form the first polymer particles having an average diameter of 5 to 90 nm in the slurry,
   wherein the coating film includes second polymer particles and a connecting part connecting the second polymer particles, each of the second polymer particles having a core and a shell, where the first polymer particle is the core, the shell and the connecting part includes the first polymer, and the shell and the connecting part are formed through evaporation of the mixed solvent to precipitate the first polymer from the droplets, and
   wherein the first solvent is a solvent having a Hansen Relative Energy Difference (RED) of less than 1 for the first polymer, and the second solvent is a solvent having a RED of greater than 1 for the second polymer, wherein the RED is represented by the following equation:

$$RED = R_a/R_0 \quad [\text{Equation}]$$

in the above equation, $$R_a = \sqrt{(2\delta_{h2} - 2\delta_{h1})^2 + (\delta_{p2} - \delta_{p1})^2 + (\delta_{d2} - \delta_{d1})^2}$$

$R_0$ is the polymer's interaction radius, $\delta_{h1}$ is the polymer's hydrogen bond interaction, $\delta_{p1}$ is the polymer's polar interaction, $\delta_{d1}$ is the polymer's dispersion force, $\delta_{h2}$ is the solvent's hydrogen bond interaction, $\delta_{p2}$ is the solvent's polarity interaction, and $\delta_{d2}$ is the solvent's dispersion force.

2. The electrostatic spray deposition method of claim 1, wherein the second solvent is contained in an amount of 10 to 1000 parts by weight based on 100 parts by weight of the first solvent.

3. The electrostatic spray deposition method of claim 1, wherein the first polymer is in a saturated state in the mixed solvent.

4. The electrostatic spray deposition method of claim 1, wherein the slurry further comprises the second polymer dissolved in the mixed solvent.

5. The electrostatic spray deposition method of claim 1, wherein the slurry further comprises a solvent having a dielectric constant ε in the range of 4 to 40.

* * * * *